(12) United States Patent
Kazama et al.

(10) Patent No.: US 10,354,443 B2
(45) Date of Patent: Jul. 16, 2019

(54) ADAPTIVE LOAD BALANCING IN SOFTWARE EMULATION OF GPU HARDWARE

(71) Applicant: Sony Interactive Entertainment Inc., Tokyo (JP)

(72) Inventors: Takayuki Kazama, Foster City, CA (US); Victor Octav Suba Miura, Foster City, CA (US)

(73) Assignee: SONY INTERACTIVE ENTERTAINMENT INC., Tokyo (JP)

(*) Notice: Subject to any disclaimer, the term of this patent is extended or adjusted under 35 U.S.C. 154(b) by 0 days.

(21) Appl. No.: 15/225,361

(22) Filed: Aug. 1, 2016

(65) Prior Publication Data

US 2016/0364906 A1   Dec. 15, 2016

Related U.S. Application Data

(63) Continuation of application No. 13/631,803, filed on Sep. 28, 2012, now abandoned.

(51) Int. Cl.
  *H04N 1/60* (2006.01)
  *H04N 1/64* (2006.01)
  (Continued)

(52) U.S. Cl.
  CPC .............. *G06T 17/10* (2013.01); *G06F 9/505* (2013.01); *G06T 1/20* (2013.01); *G06T 11/001* (2013.01);
  (Continued)

(58) Field of Classification Search
  CPC .... G06T 11/001; H04N 1/642; H04N 1/6069; H04N 21/4318
  See application file for complete search history.

(56) References Cited

U.S. PATENT DOCUMENTS

6,009,458 A   12/1999   Hawkins et al.
6,280,323 B1   8/2001   Yamazaki et al.
(Continued)

FOREIGN PATENT DOCUMENTS

WO   2014052205 A1   4/2014

OTHER PUBLICATIONS

European Search Report and Written Opinion for EP Application No. 13841130.1, dated Oct. 4, 2016.
(Continued)

*Primary Examiner* — Matthew Salvucci
(74) *Attorney, Agent, or Firm* — JDI Patent; Joshua Isenberg; Robert Pullman (57) ABSTRACT

Aspects of the present disclosure describe a software based emulator of a graphics processing unit (GPU) that is configured to operate over a cloud-based network. A virtual image containing graphics primitives is divided into a plurality of tiles. A load balancer assigns tiles to rasterization threads in order to evenly distribute the processing load. The rasterization threads then rasterize their assigned tiles and deliver rendered pixels to a frame buffer. The frame buffer builds a frame from the rendered pixels and then delivers the frame over the network to a client device platform. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

10 Claims, 7 Drawing Sheets

(51) Int. Cl.
*G06T 11/00* (2006.01)
*H04N 21/431* (2011.01)
*G06T 17/10* (2006.01)
*G06T 15/08* (2011.01)
*G06F 9/50* (2006.01)
*G06T 1/20* (2006.01)

(52) U.S. Cl.
CPC ........... *G06T 15/08* (2013.01); *H04N 1/6069* (2013.01); *H04N 1/642* (2013.01); *H04N 21/4318* (2013.01); *G06F 2209/5017* (2013.01); *G06F 2209/5018* (2013.01)

(56) References Cited

U.S. PATENT DOCUMENTS

| | | | |
|---|---|---|---|
| 6,402,620 B1 | 6/2002 | Naghi | |
| 6,699,127 B1 | 3/2004 | Lobb et al. | |
| 7,159,008 B1 | 1/2007 | Wies et al. | |
| 7,286,132 B2 | 10/2007 | Kuhne | |
| 7,470,196 B1 | 12/2008 | Joshi | |
| 7,493,365 B2 | 2/2009 | Wies et al. | |
| 7,841,946 B2 | 11/2010 | Walker et al. | |
| 8,085,264 B1* | 12/2011 | Crow | G06T 15/005 345/419 |
| 8,267,796 B2 | 9/2012 | Iwakiri | |
| 8,321,571 B2 | 11/2012 | Crowder, Jr. et al. | |
| 8,661,496 B2 | 2/2014 | Perlman et al. | |
| 8,935,487 B2 | 1/2015 | Sengupta et al. | |
| 9,248,374 B2 | 2/2016 | Watson et al. | |
| 9,258,012 B2 | 2/2016 | Miura | |
| 2002/0002510 A1 | 1/2002 | Sharp et al. | |
| 2002/0045484 A1 | 4/2002 | Eck et al. | |
| 2002/0065915 A1 | 5/2002 | Anderson et al. | |
| 2003/0037030 A1 | 2/2003 | Dutta et al. | |
| 2003/0190950 A1 | 10/2003 | Matsumoto | |
| 2003/0225560 A1 | 12/2003 | Garcia et al. | |
| 2004/0179019 A1* | 9/2004 | Sabella | G09G 5/393 345/537 |
| 2004/0224772 A1 | 11/2004 | Canessa et al. | |
| 2004/0266529 A1 | 12/2004 | Chatani | |
| 2005/0195187 A1 | 9/2005 | Seiler et al. | |
| 2005/0288954 A1 | 12/2005 | McCarthy et al. | |
| 2006/0009290 A1 | 1/2006 | Taho et al. | |
| 2006/0080702 A1 | 4/2006 | Diez et al. | |
| 2006/0117260 A1 | 6/2006 | Sloo et al. | |
| 2006/0146057 A1 | 7/2006 | Blythe | |
| 2006/0160626 A1 | 7/2006 | Gatto et al. | |
| 2006/0259292 A1 | 11/2006 | Solomon et al. | |
| 2007/0060361 A1 | 3/2007 | Nguyen et al. | |
| 2007/0298866 A1 | 12/2007 | Gaudiano et al. | |
| 2008/0032794 A1 | 2/2008 | Ware et al. | |
| 2008/0113749 A1 | 5/2008 | Williams et al. | |
| 2008/0282241 A1 | 11/2008 | Dong | |
| 2008/0300053 A1 | 12/2008 | Muller | |
| 2009/0082102 A1 | 3/2009 | Sargaison et al. | |
| 2009/0088236 A1 | 4/2009 | Laude et al. | |
| 2009/0098943 A1 | 4/2009 | Weber et al. | |
| 2009/0162029 A1 | 6/2009 | Glen | |
| 2009/0282139 A1 | 11/2009 | Mejdrich et al. | |
| 2009/0303245 A1* | 12/2009 | Soupikov | G06T 15/005 345/582 |
| 2010/0088296 A1 | 4/2010 | Periyagaram et al. | |
| 2010/0250650 A1 | 9/2010 | Allen | |
| 2010/0259536 A1 | 10/2010 | Toksvig et al. | |
| 2011/0013699 A1 | 1/2011 | Persson | |
| 2011/0098111 A1 | 4/2011 | Saito et al. | |
| 2011/0218037 A1 | 9/2011 | Singh | |
| 2011/0299105 A1* | 12/2011 | Morrison | G06T 11/40 358/1.9 |
| 2012/0021840 A1 | 1/2012 | Johnson et al. | |
| 2012/0052930 A1 | 3/2012 | Mcgucken | |
| 2012/0142425 A1 | 6/2012 | Scott et al. | |
| 2012/0299940 A1 | 11/2012 | Dietrich et al. | |
| 2013/0137518 A1 | 5/2013 | Lucas | |
| 2014/0004941 A1 | 1/2014 | Watson et al. | |
| 2014/0004949 A1 | 1/2014 | Miura et al. | |
| 2014/0004956 A1 | 1/2014 | Miura et al. | |
| 2014/0004957 A1 | 1/2014 | Stine et al. | |
| 2014/0004962 A1 | 1/2014 | Miura et al. | |
| 2014/0066177 A1 | 3/2014 | Zalewski | |
| 2014/0092087 A1 | 4/2014 | Kazama et al. | |
| 2014/0094299 A1 | 4/2014 | Stine et al. | |
| 2014/0094313 A1 | 4/2014 | Watson et al. | |
| 2014/0094314 A1 | 4/2014 | Watson et al. | |
| 2014/0094315 A1 | 4/2014 | Stine et al. | |

OTHER PUBLICATIONS

Non-Final Office Action for U.S. Appl. No. 13/631,785, dated Nov. 3, 2016.
Non-Final Office Action for U.S. Appl. No. 13/631,812, dated Jan. 18, 2017.
Notice of Allowance for U.S. Appl. No. 13/790,320, dated Dec. 5, 2016.
Non-Final Office Action for U.S. Appl. No. 13/631,785, dated Oct. 22, 2014.
Non-Final Office Action for U.S. Appl. No. 13/631,803, dated Oct. 14, 2014.
Non-Final Office Action for U.S. Appl. No. 13/791,379, dated Oct. 16, 2014.
U.S. Appl. No. 61/666,628, entitled "Adding Triggers to Cloud-Based Emulated Games" to Victor Octav Suba Miura et al., filed Jun. 30, 2013.
U.S. Appl. No. 61/666,645, entitled "Haptic Enhancements for Emulated Video Game Not Originally Designed With Haptic Capabilities" to Victor Octav Suba Miura, et al., filed Jun. 29, 2012.
U.S. Appl. No. 61/666,665, entitled "Conversion of Haptic Events Into Screen Events" to Brian Michael, et al., filed Jun. 30, 2013.
U.S. Appl. No. 61/666,679, entitled "Suspending State of Cloud-Based Legacy Application" to Jacob P. Stine et al., filed Jun. 30, 2013.
U.S. Appl. No. 61/666,628, to Victor Octav Suba Miura, filed Jun. 29, 2012.
U.S. Appl. No. 61/666,645, to Victor Octav Suba Miura, filed Jun. 29, 2012.
U.S. Appl. No. 61/666,665, to Brian Michael Christopher Watson, filed Jun. 29, 2012.
U.S. Appl. No. 61/666,679, to Jacob P. Stine, filed Jun. 29, 2012.
U.S. Appl. No. 61/694,718, to Gary M. Zalewski, filed Aug. 29, 2012.
U.S. Appl. No. 61/794,811, to Victor Octav Suba Miura, filed Mar. 15, 2013.
Final Office Action for U.S. Appl. No. 13/631,725, dated Dec. 19, 2014.
Final Office Action for U.S. Appl. No. 13/631,740, dated Jul. 27, 2015.
Final Office Action for U.S. Appl. No. 13/631,785, dated Dec. 4, 2015.
Final Office Action for U.S. Appl. No. 13/631,803, dated Feb. 1, 2016.
Final Office Action for U.S. Appl. No. 13/631,812, dated Aug. 29, 2014.
Final Office Action for U.S. Appl. No. 13/790,311, dated Jul. 15, 2016.
Final Office Action for U.S. Appl. No. 13/790,320, dated Feb. 10, 2016.
Final Office Action for U.S. Appl. No. 13/790,320, dated Jan. 15, 2015.
Final Office Action for U.S. Appl. No. 13/791,379, dated May 13, 2015.
Final Office Action for U.S. Appl. No. 13/791,420, dated Jun. 11, 2014.
Final Office Action for U.S. Appl. No. 13/791,420, dated Oct. 9, 2015.
Final Office Action for U.S. Appl. No. 13/791,434, dated Feb. 17, 2016.

(56) References Cited

OTHER PUBLICATIONS

Final Office Action for U.S. Appl. No. 13/791,434, dated Jun. 23, 2015.
Final Office Action for U.S. Appl. No. 13/792,664, dated Jan. 20, 2015.
Final Office Action for U.S. Appl. No. 13/792,664, dated Jun. 17, 2016.
Final Office Action for U.S. Appl. No. 15/019,891, dated Oct. 19, 2016.
Final Office Action for U.S. Appl. No. 13/631,803, dated Apr. 16, 2015.
Final Office Action for U.S. Appl. No. 13/790,311, dated Mar. 27, 2015.
Non-Final Office Action for U.S. Appl. No. 13/790,311, dated Jun. 27, 2013.
Non-Final Office Action for U.S. Appl. No. 13/631,725, dated Mar. 16, 2015.
Non-Final Office Action for U.S. Appl. No. 13/631,725, dated Sep. 12, 2014.
Non-Final Office Action for U.S. Appl. No. 13/631,740, dated Oct. 21, 2014.
Non-Final Office Action for U.S. Appl. No. 13/631,812, dated Jun. 3, 2016.
Non-Final Office Action for U.S. Appl. No. 13/631,812, dated Mar. 28, 2014.
Non-Final Office Action for U.S. Appl. No. 13/790,311, dated Feb. 26, 2014.
Non-Final Office Action for U.S. Appl. No. 13/790,311,dated Sep. 9, 2014.
Non-Final Office Action for U.S. Appl. No. 13/790,320, dated Jun. 18, 2014.
Non-Final Office Action for U.S. Appl. No. 13/791,379, dated Mar. 27, 2014.
Non-Final Office Action for U.S. Appl. No. 13/791,420, dated Mar. 27, 2014.
Non-Final Office Action for U.S. Appl. No. 13/792,664, dated Jun. 23, 2014.
Non-Final Office Action for U.S. Appl. No. 13/791,434, dated Nov. 26, 2014
Non-Final Office Action for U.S. Appl. No. 13/631,740, dated Feb. 27, 2015.
Non-Final Office Action for U.S. Appl. No. 13/631,740, dated Sep. 30, 2016.
Non-Final Office Action for U.S. Appl. No. 13/631,785, dated May 21, 2015.
Non-Final Office Action for U.S. Appl. No. 13/631,803, dated Sep. 17, 2015.
Non-Final Office Action for U.S. Appl. No. 13/790,311, dated Nov. 19, 2015.
Non-Final Office Action for U.S. Appl. No. 13/790,320, dated Jul. 28, 2015.
Non-Final Office Action for U.S. Appl. No. 13/791,379, dated Jul. 1, 2016.
Non-Final Office Action for U.S. Appl. No. 13/791,420, dated Apr. 9, 2015.
Non-Final Office Action for U.S. Appl. No. 13/792,664, dated Dec. 4, 2015.
Non-Final Office Action for U.S. Appl. No. 14/183,351, dated May 11, 2015.
Non-Final Office Action for U.S. Appl. No. 15/019,891, dated May 6, 2016.
Notice of Allowance for U.S. Appl. No. 15/019,891, dated Jan. 26, 2017.

* cited by examiner

ADAPTIVE LOAD BALANCING IN SOFTWARE EMULATION OF GPU HARDWARE

CLAIM OF PRIORITY

This application is a continuation of commonly-assigned, application Ser. No. 13/631,803, filed Sep. 28, 2012 (now U.S. Patent Application Publication Number 2014/0092087, the entire disclosures of which are incorporated herein by reference.

CROSS-REFERENCE TO RELATED APPLICATION

This application is related to commonly-assigned, provisional application Ser. No. 61/666,628, filed Jun. 29, 2012, and entitled "DETERMINING TRIGGERS FOR CLOUD-BASED EMULATED GAMES", the entire disclosures of which are incorporated herein by reference.

This application is related to commonly-assigned, application Ser. No. 13/790,311, filed Mar. 8, 2013 (now U.S. Patent Application Publication Number 2014/0004956), and entitled "ADDING TRIGGERS TO CLOUD-BASED EMULATED GAMES" to Victor Octav Suba Miura, Brian Michael Christopher Watson, Jacob P. Stine, and Nicholas J. Cardell, the entire disclosures of which are incorporated herein by reference.

This application is related to commonly-assigned, provisional application Ser. No. 61/666,645, filed Jun. 29, 2012, and entitled "HAPTIC ENHANCEMENTS FOR EMULATED VIDEO GAME NOT ORIGINALLY DESIGNED WITH HAPTIC CAPABILITIES", the entire disclosures of which are incorporated herein by reference.

This application is related to commonly-assigned, application Ser. No. 13/791,434, filed Mar. 8, 2013 (now U.S. Patent Application Publication Number 2014/0004949), and entitled "HAPTIC ENHANCEMENTS FOR EMULATED VIDEO GAME NOT ORIGINALLY DESIGNED WITH HAPTIC CAPABILITIES" to Victor Octav Suba Miura and Brian Michael Christopher Watson, the entire disclosures of which are incorporated herein by reference.

This application is related to commonly-assigned, provisional application Ser. No. 61/666,665, filed Jun. 29, 2012, and entitled "CONVERSION OF HAPTIC EVENTS INTO SCREEN EVENTS", the entire disclosures of which are incorporated herein by reference.

This application is related to commonly-assigned, application Ser. No. 13/791,420, filed Mar. 8, 2013 (now U.S. Patent Application Publication Number 2014/0004941), and entitled "CONVERSION OF HAPTIC EVENTS INTO SCREEN EVENTS" to Brian Michael Christopher Watson and Victor Octav Suba Miura, the entire disclosures of which are incorporated herein by reference.

This application is related to commonly-assigned, provisional application Ser. No. 61/666,679, filed Jun. 29, 2012, and entitled "SUSPENDING STATE OF CLOUD-BASED LEGACY APPLICATIONS", the entire disclosures of which are incorporated herein by reference.

This application is related to commonly-assigned, application Ser. No. 13/791,379, filed Mar. 8, 2013 (now U.S. Patent Application Publication Number 2014/0004957), and entitled "SUSPENDING STATE OF CLOUD-BASED LEGACY APPLICATIONS" to Jacob P. Stine, Brian Michael Christopher Watson, Victor Octav Suba Miura, and Nicholas J. Cardell, the entire disclosures of which are incorporated herein by reference.

This application is related to commonly-assigned, application Ser. No. 13/631,725, filed Sep. 28, 2012, and entitled "REPLAY AND RESUMPTION OF SUSPENDED GAME" to Brian Michael Christopher Watson, Victor Octav Suba Miura, Jacob P. Stine and Nicholas J. Cardell, filed Sep. 28, 2012 (now U.S. Pat. No. 9,248,374), the entire disclosures of which are incorporated herein by reference.

This application is related to commonly-assigned, application Ser. No. 13/631,740, filed Sep. 28, 2012 (now U.S. Patent Application Publication Number 2014/0094314), and entitled "METHOD FOR CREATING A MINI-GAME" to Brian Michael Christopher Watson, Victor Octav Suba Miura, and Jacob P. Stine, the entire disclosures of which are incorporated herein by reference.

This application is related to commonly-assigned, application Ser. No. 13/631,785, filed Sep. 28, 2012 (now U.S. Patent Application Publication Number 2014/0094315), and entitled "PRE-LOADING TRANSLATED CODE IN CLOUD BASED EMULATED APPLICATIONS", to Jacob P. Stine, Victor Octav Suba Miura, Brian Michael Christopher Watson, and Nicholas J. Cardell the entire disclosures of which are incorporated herein by reference.

This application is related to commonly-assigned, application Ser. No. 13/631,812, filed Sep. 28, 2012 (now U.S. Patent Application Publication Number 2014/0094299), entitled "METHOD AND APPARATUS FOR IMPROVING EFFICIENCY WITHOUT INCREASING LATENCY IN EMULATION OF A LEGACY APPLICATION TITLE", to Jacob P. Stine and Victor Octav Suba Miura, the entire disclosures of which are incorporated herein by reference.

FIELD OF THE DISCLOSURE

The present disclosure is related to video game emulation. Among other things, this application describes a method and apparatus for emulating a graphics processing unit (GPU) over a cloud based network with tile-based rasterization.

BACKGROUND OF THE INVENTION

In three dimensional graphics rendering, a graphics processing unit (GPU) may transform a three-dimensional virtual object into a two-dimensional image that may be displayed on a screen. The GPU may use one or more graphics pipelines for processing information initially provided to the GPU, such as graphics primitives. Graphics primitives are properties that are used to describe a three-dimensional object that is being rendered. By way of example, graphics primitives may be lines, triangles, or vertices that form a three dimensional object when combined. Each of the graphics primitives may contain additional information to further define the three dimensional object such as, but not limited to X-Y-Z coordinates, red-green-blue (RGB) values, translucency, texture, and reflectivity.

A critical step in a graphics pipeline is the rasterization step. Rasterization is the process by which the graphics primitives describing the three-dimensional object are transformed into a two-dimensional image representation of the scene. The two-dimensional image is comprised of individual pixels, each of which may contain unique RGB values. Typically, the GPU will rasterize a three-dimensional image by stepping across the entire three-dimensional object in raster pattern along a two dimensional plane. Each step along the line represents one pixel. At each step, the GPU must determine if the pixel should be rendered and delivered to the frame buffer. If the pixel has not changed from a previous rendering, then there is no need to deliver an updated pixel to the frame buffer. Therefore, each raster line may have a variable number of pixels that must be processed. In order to quickly process the three-dimensional object, a plurality of rasterization threads may each be assigned one or more of the raster lines to process, and the rasterization threads may be executed in parallel.

When a GPU is being emulated through software, the processing capabilities may not be as efficient or as highly optimized as they would be in the original hardware based GPU. Therefore, if the processing load on each rasterization thread is not properly balanced, a delay or latency in the execution of the rasterization may develop. Further, it is difficult to predict the number of pixels that will be rendered along each raster line before it is processed. Without knowing a priori the processing load each rasterization thread is assigned, it is difficult to ensure that load can be evenly balanced.

In order to prevent latencies, the emulation software may dedicate an increased number of available rasterization threads to the rasterization process. This increases the demand on the processor running the emulation software. Also, in the case of cloud-based services, the number of instances of the emulation software that will be running at a given time is not known beforehand. If the emulation software requires extensive processing power, then scaling the system for increased users becomes prohibitively expensive. By way of example, during peak usage hours, there may be many instances of the emulator being executed on the network. This requires that resources such as processing power be used as efficiently as possible.

Further, the efficiency of the processing power cannot be made by decreasing the frame rate that the emulator is capable of producing. The frame rate should ideally remain above 24 frames per second in order to ensure smooth animation. In order to provide a scalable software emulator of a GPU that is implemented over a cloud-based network, a rasterization method that allows for efficient load balancing is needed.

It is within this context that aspects of the present disclosure arise.

DETAILED DESCRIPTION OF THE DRAWINGS

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Aspects of the present disclosure describe a software based emulator of a graphics processing unit (GPU) that is configured to operate over a cloud-based network. A virtual image containing graphics primitives is first divided into a plurality of tiles. Each of the tiles has a predetermined number of image pixels. The emulator may then scan each of the tiles to determine how many of the image pixels in each tile need to be rendered. The number of pixels that need to be rendered for each tile is then delivered to a load balancer. The load balancer distributes the processing between rasterization threads. Each rasterization thread will be assigned approximately the same total number of pixels to be rendered. The rasterization threads then rasterize their assigned tiles, and render the pixels that require rendering. Additionally, the rasterization threads may deliver the rendered pixels to a frame buffer. The frame buffer builds a frame from the rendered pixels and then delivers the frame over the network to a client device platform.

Additional aspects of the present disclosure describe a software based emulator of a GPU that is configured to operate over a cloud-based network. A virtual image containing graphics primitives is first divided into a plurality of tiles. Each of the tiles has a predetermined number of image pixels. The emulator may then scan each of the tiles to determine if any of the image pixels that are within a tile need to be rendered. Pixels that do not need to be rendered are sometimes referred to herein as "ignorable" pixels. If at least one image pixel in a tile needs to be rendered, then a message is sent to a load balancer indicating that the tile is "full". Once each tile has been scanned, the load balancer can divide the "full" tiles evenly between the available rasterization threads. Each rasterization thread then rasterizes the assigned tiles and delivers the rendered pixels to a frame buffer. The frame buffer builds a frame from the rendered pixels and then delivers the frame over the network to a client device platform.

Figure 1:
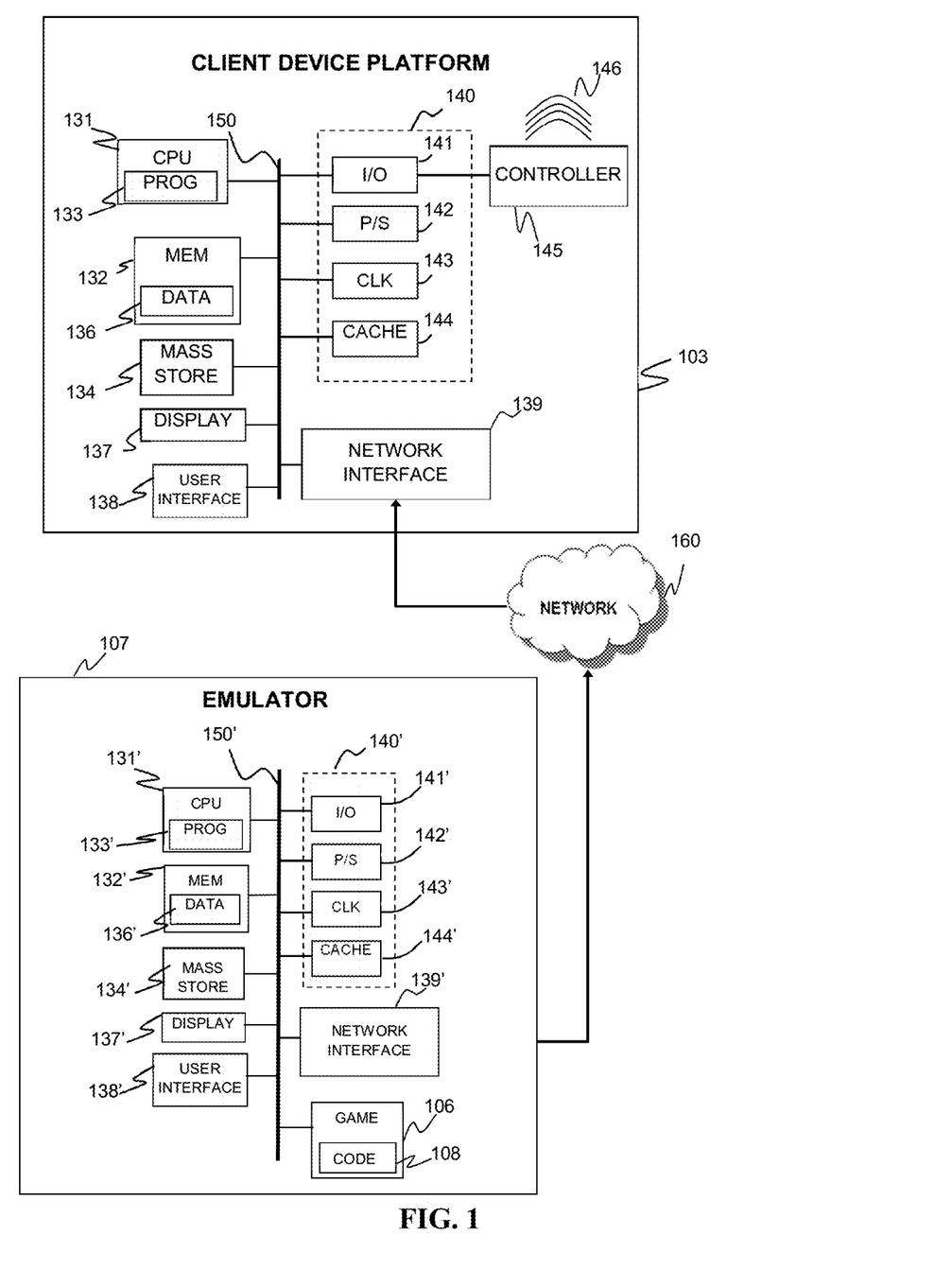
FIG. 1 is a schematic diagram of a snapshot generator and an emulator communicating over a network according to an aspect of the present disclosure.

FIG. 1A is a schematic of an embodiment of the present invention. Emulator 107 may be accessed by a client device platform 103 over a network 160. Client device platform 103 may access alternative emulators 107 over the network 160. Emulators 107 may be identical to each other, or they may each be programmed to emulate unique legacy game titles 106 or unique sets of legacy game titles 106.

Client device platform 103 may include a central processor unit (CPU) 131. By way of example, a CPU 131 may include one or more processors, which may be configured according to, e.g., a dual-core, quad-core, multi-core, or Cell processor architecture. Snapshot generator 102 may also include a memory 132 (e.g., RAM, DRAM, ROM, and the like). The CPU 131 may execute a process-control program 133, portions of which may be stored in the memory 132. The client device platform 103 may also include well-known support circuits 140, such as input/output (I/O) circuits 141, power supplies (P/S) 142, a clock (CLK) 143 and cache 144. The client device platform 103 may optionally include a mass storage device 134 such as a disk drive, CD-ROM drive, tape drive, or the like to store programs and/or data. The client device platform 103 may also optionally include a display unit 137 and a user interface unit 138 to facilitate interaction between the client device platform 103 and a user. The display unit 137 may be in the form of a cathode ray tube (CRT) or flat panel screen that displays text, numerals, or graphical symbols. The user interface unit 138 may include a keyboard, mouse, joystick, light pen, or other device. A controller 145 may be connected to the client device platform 103 through the I/O circuit 141 or it may be directly integrated into the client device platform 103. The controller 145 may facilitate interaction between the client device platform 103 and a user. The controller 145 may include a keyboard, mouse, joystick, light pen, hand-held controls or other device. The controller 145 may be capable of generating a haptic response 146. By way of example and not by way of limitation, the haptic response 146 may be vibrations or any other feedback corresponding to the sense of touch. The client device platform 103 may include a network interface 139, configured to enable the use of Wi-Fi, an Ethernet port, or other communication methods.

The network interface 139 may incorporate suitable hardware, software, firmware or some combination of two or more of these to facilitate communication via an electronic communications network 160. The network interface 139 may be configured to implement wired or wireless communication over local area networks and wide area networks such as the Internet. The client device platform 103 may send and receive data and/or requests for files via one or more data packets over the network 160.

The preceding components may exchange signals with each other via an internal system bus 150. The client device platform 103 may be a general purpose computer that becomes a special purpose computer when running code that implements embodiments of the present invention as described herein.

The emulator 107 may include a central processor unit (CPU) 131'. By way of example, a CPU 131' may include one or more processors, which may be configured according to, e.g., a dual-core, quad-core, multi-core, or Cell processor architecture. The emulator 107 may also include a memory 132' (e.g., RAM, DRAM, ROM, and the like). The CPU 131' may execute a process-control program 133', portions of which may be stored in the memory 132'. The emulator 107 may also include well-known support circuits 140', such as input/output (I/O) circuits 141', power supplies (P/S) 142', a clock (CLK) 143' and cache 144'. The emulator 107 may optionally include a mass storage device 134' such as a disk drive, CD-ROM drive, tape drive, or the like to store programs and/or data. The emulator 107 may also optionally include a display unit 137' and user interface unit 138' to facilitate interaction between the emulator 107 and a user who requires direct access to the emulator 107. By way of example and not by way of limitation a snapshot generator or engineer 102 may need direct access to the emulator 107 in order to program the emulator 107 to properly emulate a desired legacy game 106 or to add additional mini-game capabilities to a legacy game 106. The display unit 137' may be in the form of a cathode ray tube (CRT) or flat panel screen that displays text, numerals, or graphical symbols. The user interface unit 138' may include a keyboard, mouse, joystick, light pen, or other device. The emulator 107 may include a network interface 139', configured to enable the use of Wi-Fi, an Ethernet port, or other communication methods.

The network interface 139' may incorporate suitable hardware, software, firmware or some combination of two or more of these to facilitate communication via the electronic communications network 160. The network interface 139' may be configured to implement wired or wireless communication over local area networks and wide area networks such as the Internet. The emulator 107 may send and receive data and/or requests for files via one or more data packets over the network 160.

The preceding components may exchange signals with each other via an internal system bus 150'. The emulator 107 may be a general purpose computer that becomes a special purpose computer when running code that implements embodiments of the present invention as described herein.

Emulator 107 may access a legacy game 106 that has been selected by the client device platform 103 for emulation through the internal system bus 150'. There may be more than one legacy game 106 stored in the emulator. The legacy games may also be stored in the memory 132' or in the mass storage device 134'. Additionally, one or more legacy games 106 may be stored at a remote location accessible to the emulator 107 over the network 160. Each legacy game 106 contains game code 108. When the legacy game 106 is emulated, the game code 108 produces legacy game data 109.

By way of example, a legacy game 106 may be any game that is not compatible with a target platform. By way of example and not by way of limitation, the legacy game 106 may have been designed to be played on Sony Computer Entertainment's PlayStation console, but the target platform is a home computer. By way of example, the legacy game 106 may have been designed to be played on a PlayStation 2 console, but the target platform is a PlayStation 3 console. Further, by way of example and not by way of limitation, a legacy game 106 may have been designed to be played on a PlayStation console, but the target platform is a hand held console such as the PlayStation Vita from Sony Computer Entertainment.

Emulator 107 may be a deterministic emulator. A deterministic emulator is an emulator that may process a given set of game inputs the same way every time that the same set of inputs are provided to the emulator 107. This may be accomplished by eliminating any dependencies in the code run by the emulator 107 that depend from an asynchronous activity. Asynchronous activities are events that occur independently of the main program flow. This means that actions may be executed in a non-blocking scheme in order to allow the main program flow to continue processing. Therefore, by way of example, and not by way of limitation, the emulator 107 may be deterministic when the dependencies in the code depend from basic blocks that always begin and end with synchronous activity. By way of example, basic blocks may be predetermined increments of code at which the emulator 107 checks for external events or additional game inputs. The emulator 107 may also wait for anything that runs asynchronously within a system component to complete before proceeding to the next basic block. A steady state within the emulator 107 may be when all of the basic blocks are in lock step.

Figure 2A:
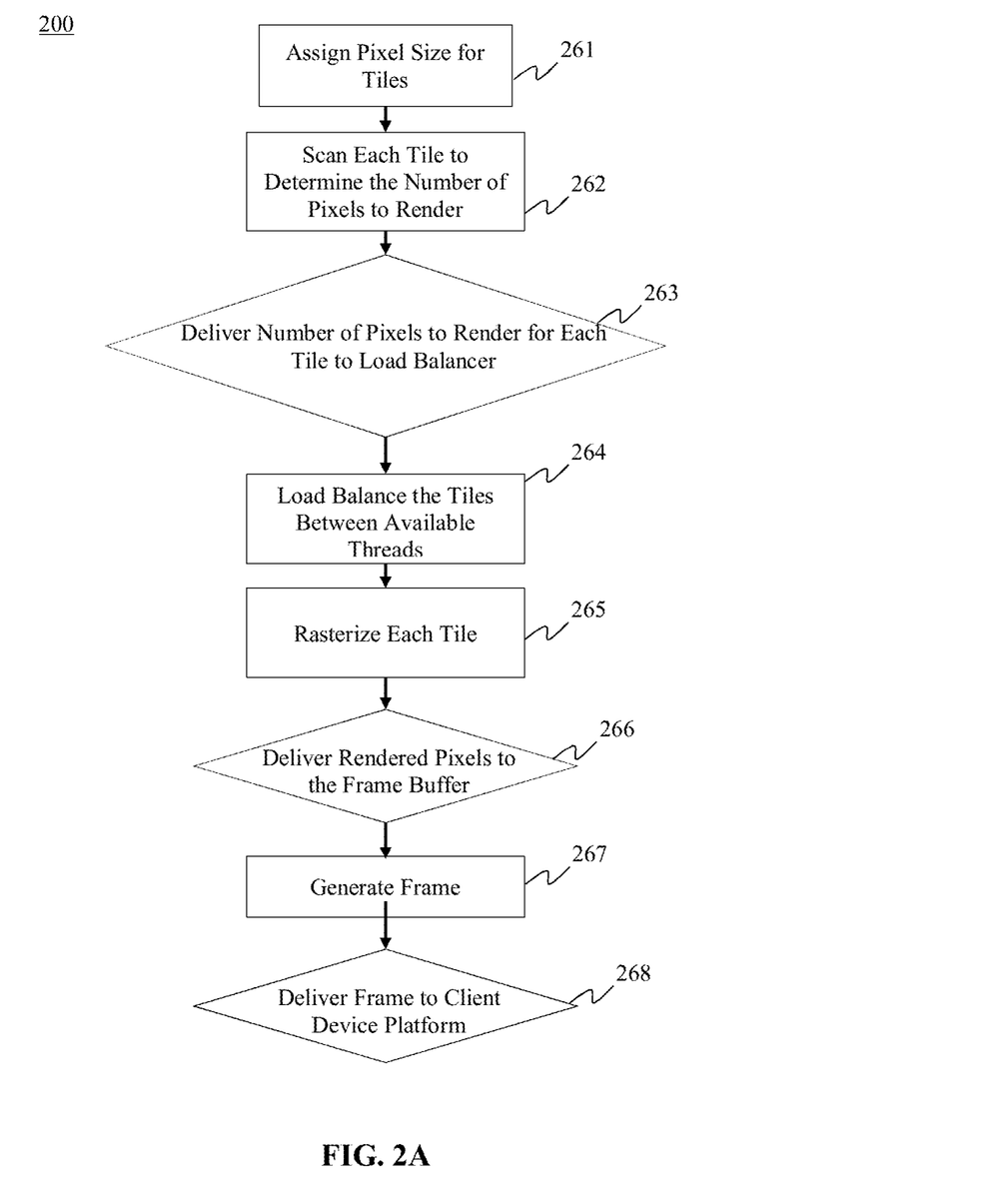
FIG. 2A-2B are flow diagrams of a methods for using tile-based rasterization as part of a software based emulation of a GPU implemented over a cloud-based network according various aspects of the present disclosure.

FIG. 2A is a flow diagram of a method 200 for implementing the rasterization step in a graphics pipeline with a software based emulator for a GPU on a cloud-based network. At 261 the emulator 107 may divide a virtual image 320 into smaller tiles 315. By way of example, and not by way of limitation, the height and width of each tile may be 8 pixels by 8 pixels, 16 pixels by 16 pixels, or 32 pixels by 32 pixels. Each tile 315 corresponds to a portion of a frame 319 that may be displayed by the client device platform's display 137.

Figure 3A:
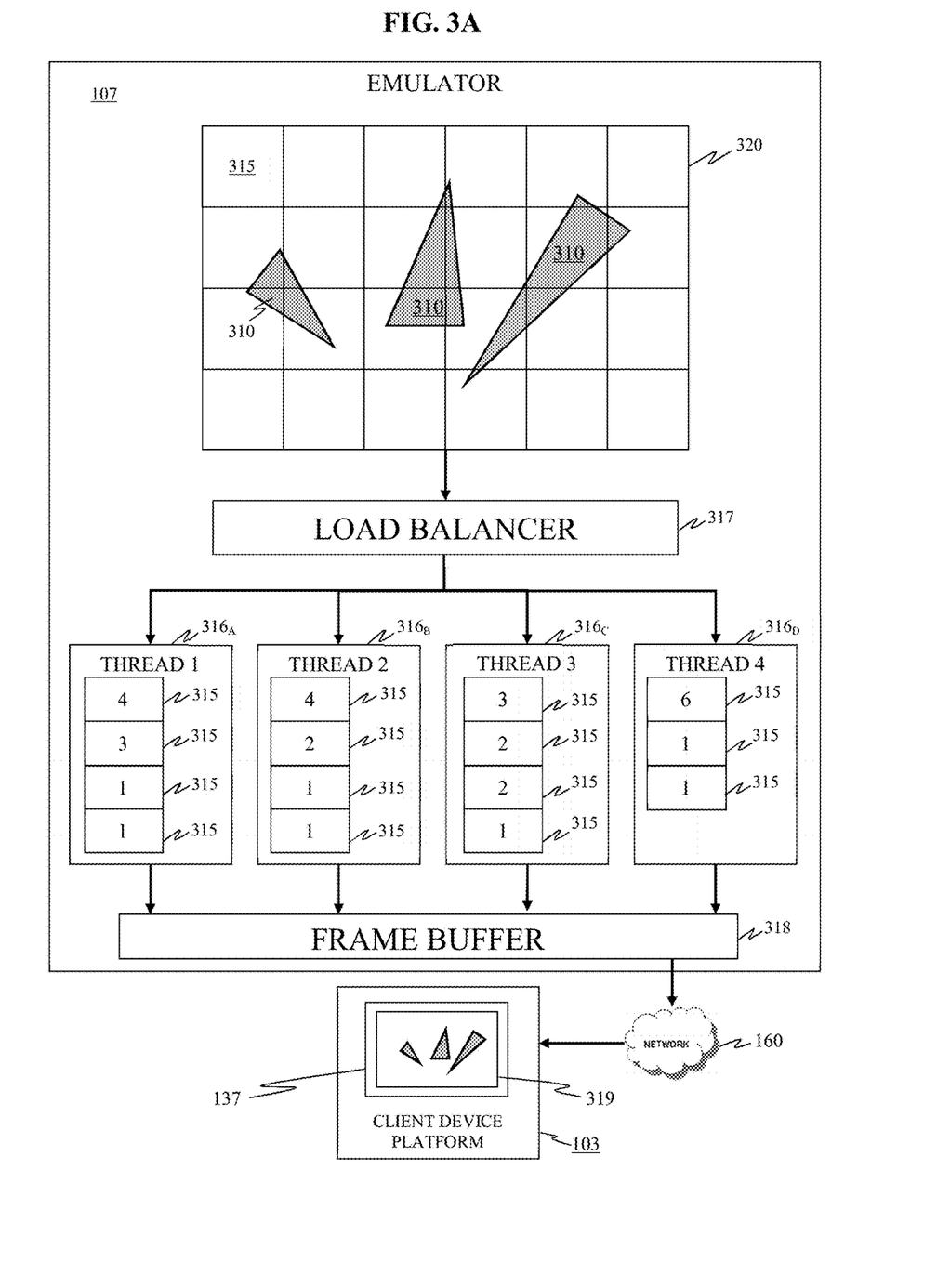
FIG. 3A-3B are schematics of software based emulators of a GPU implemented over a cloud-based network that are configured to rasterize a virtual image with tile based rasterization according to various aspects of the present disclosure.

FIG. 3A is a diagram of an emulator system 300. In FIG. 3A the arrows represent the flow of data between components. The virtual image 320 contains the graphics primitives 310 that will be rendered to produce a frame 319 that is viewable on the display 137 of the client device platform 103. The graphics primitives 310 shown in FIG. 3A are a series of triangles. However, it should be noted that the virtual image 320 may contain any alternative type of graphic primitives, such as, but not limited to, lines, points, arcs, vertices, or any combination thereof. Additionally, the graphics primitives 310 are displayed in two dimensions, but the virtual image 320 may also include three-dimensional objects.

Once the virtual image 320 has been divided into the tiles 315, method 200 continues with the emulator 107 determining which tiles 315 have pixels that need to be rendered at 262. Each tile 315 will be scanned by the emulator 107 to determine how many of the pixels within the tile 315 need to be rendered. A pixel needs to be rendered if the value of the new pixel for the frame 319 being rasterized is different from the value of the pixel presently stored in the frame buffer 318. Otherwise, the pixel is "ignorable". By way of example, and not by way of limitation, a pixel value may include X-Y-Z coordinates, RGB values, translucency, texture, reflectivity or any combination thereof. The number of pixels that need to be rendered for a given tile 315 may then be delivered to the load balancer 317 at 263.

By way of example, and not by way of limitation, the emulator 107 may determine how many pixels need to be rendered for each tile by determining whether the tile is entirely within a polygon. Each polygon is defined by the vertices. Two vertices of a polygon may be used to generate a line equation in the form of $Ax+By+C=0$. Each polygon may be made up of multiple lines. Once the size and location of the polygon has been defined, the emulator 107 may determine whether all corners of the tile lie within the polygon. If all four corners are within the polygon, then that tile is fully covered and it may be easy to apply a texture or calculate RGB values from the top left corner pixel value. If the tile is partially outside the polygon then the pixel values are determined on a per-pixel basis.

The load balancer 317 begins assigning tiles 315 to one or more rasterization threads 316 for rasterization at 264. Load balancer 317 distributes the processing load amongst the available rasterization threads 316 so that each thread 316 has approximately the same processing load. Ideally, the load balancer 317 will distribute the tiles 315 such that each rasterization thread 316 will render the same number of pixels. FIG. 3A is an example of the load balancer 317 distributing the load across several rasterization threads $316_A$, $316_B$, $316_C$, and $316_D$. Each of the tiles 315 assigned to a rasterization thread 316 has the number of pixels that need to be rendered indicated (i.e., the topmost pixel assigned to rasterization thread $316_A$ contains four pixels that need to be rendered). By way of example, rasterization thread $316_A$ is assigned four tiles 315 and a combined nine pixels that need to be rendered. The remaining rasterization threads, $316_B$, $316_C$, and $316_D$ each have eight pixels that need to be rendered. Rasterization threads $316_B$ and $316_C$ each have their eight pixels split between four tiles 315, whereas rasterization thread $316_D$ has its eight pixels spread amongst only three tiles 315. It should be noted that the number of rasterization threads 316, tiles 315, and pixels displayed in FIG. 3A are given as one example, and that there may be a greater or lesser number of each in an emulator 103. It should also be noted that if a tile does not contain pixels that require rendering, then the thread may not need to process the tile at all.

According to method 200 the rasterization threads 316 begin rasterizing the tiles 315 assigned to them by the load balancer 317 at 265. The rasterization proceeds according to a traditional raster pattern, except that it is limited to the dimensions of a single tile 315. During the rasterization, every pixel that must be rendered is delivered to the frame buffer 318 at 266. The frame buffer 318 may then build the frame 319 that will be displayed on the display 137 of the client device platform 103 at 267. At 268, the emulator 103 delivers the frame 318 to the client device platform 103 over the network 160. Additionally, the emulator 103 may use a video codec to encode the frame 319 before delivering it to the client device platform 103. The client device platform 103 may have suitable codec configured to decode the encoded frame 319.

Figure 4A:
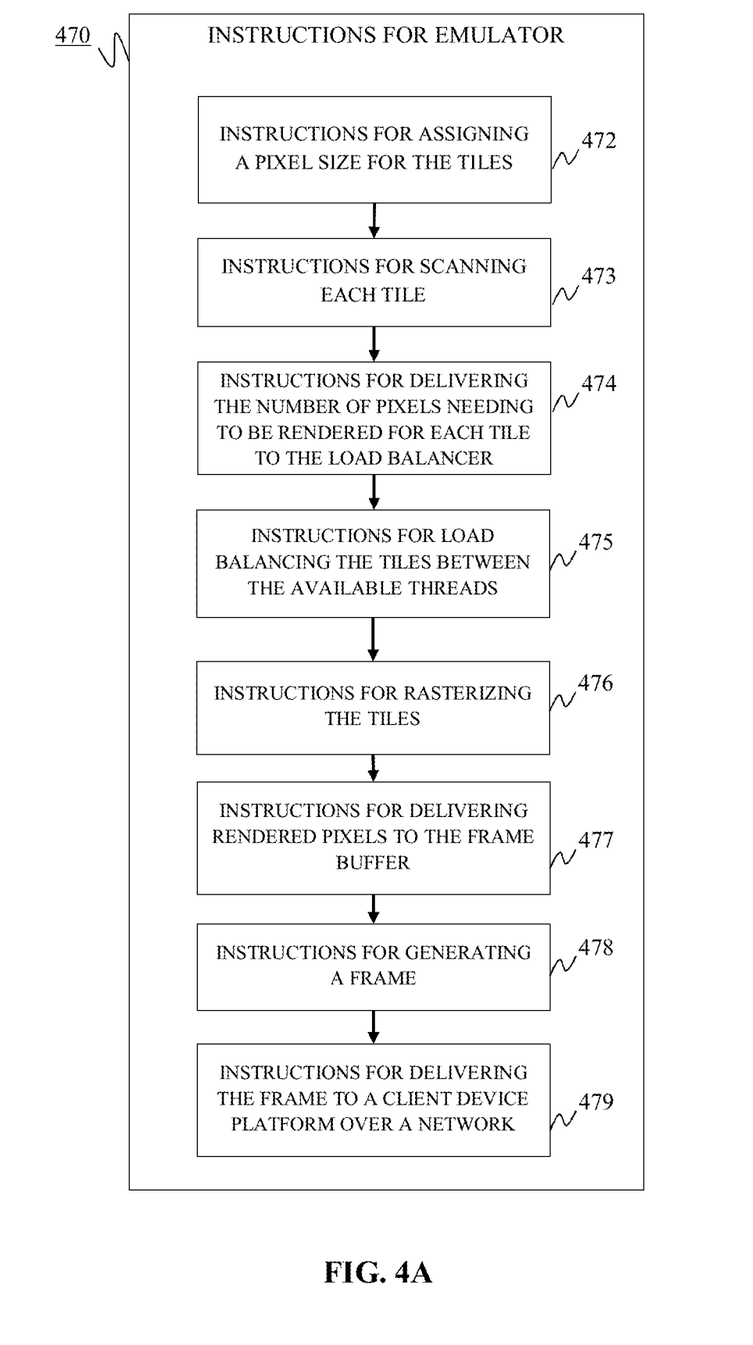
FIG. 4A-4B are block diagrams describing the instructions for how a software based emulator of a GPU implemented over a cloud-based network rasterizes a virtual image with tile based rasterization according to various aspects of the present disclosure.

As shown in FIG. 4A, a set of emulator instructions 470 may be implemented, e.g., by the emulator 107. The emulator instructions 470 may be formed on a nontransitory computer readable medium such as the memory 132' or the mass storage device 134'. The emulator instructions 470 may also be part of the process control program 133'. At 472, the instructions may include instructing the emulator to setting the predetermined size for each tile 315 of the virtual image 320. Thereafter at 473, the emulator 107 may be instructed to scan each of the tiles 315 to determine the number of pixels that need to be rendered. The emulator 107 may then be instructed to deliver the number of pixels to be rendered for each tile 315 to the load balancer 317 at 474. The emulator 317 may then be instructed to have the load balancer evenly distribute the processing load between each of the available rasterization threads 316 at 475.

By way of example, in a static load balancing arrangement hardware (e.g., Power VR) statically assigns responsibility for different tiles to different processors. The assignment number is equal to the processor core number. However, in a dynamic case, there are multiple asynchronous threads, e.g., four threads, but not as many threads as queues. A queue is a group of tiles that need to be processed. Each queue can have a state ID that allows state to be maintained. The state for an arbitrary number of tiles may be stored separately, e.g., in a different buffer. Storing the states separately reduces the amount of memory copying that needs to be done. By way of example, there may be one or more queues. The load balancer 317 may then assign an empty thread to a queue that is waiting for rendering. This maintains cache locality by keeping the threads occupied.

Next at 476, the emulator 107 may be instructed to have the rasterization threads 316 begin rasterizing each of the tiles 315. During the rasterization, the emulator 107 may be instructed to deliver the rendered pixels to the frame buffer 318 at 477. The emulator 107 may then be instructed to generate the frame 319 from the pixels in the frame buffer 318. Thereafter, the emulator 107 may be provided with instructions for delivering the frame 319 to a client device platform 103 over a network 160.

Figure 2B:
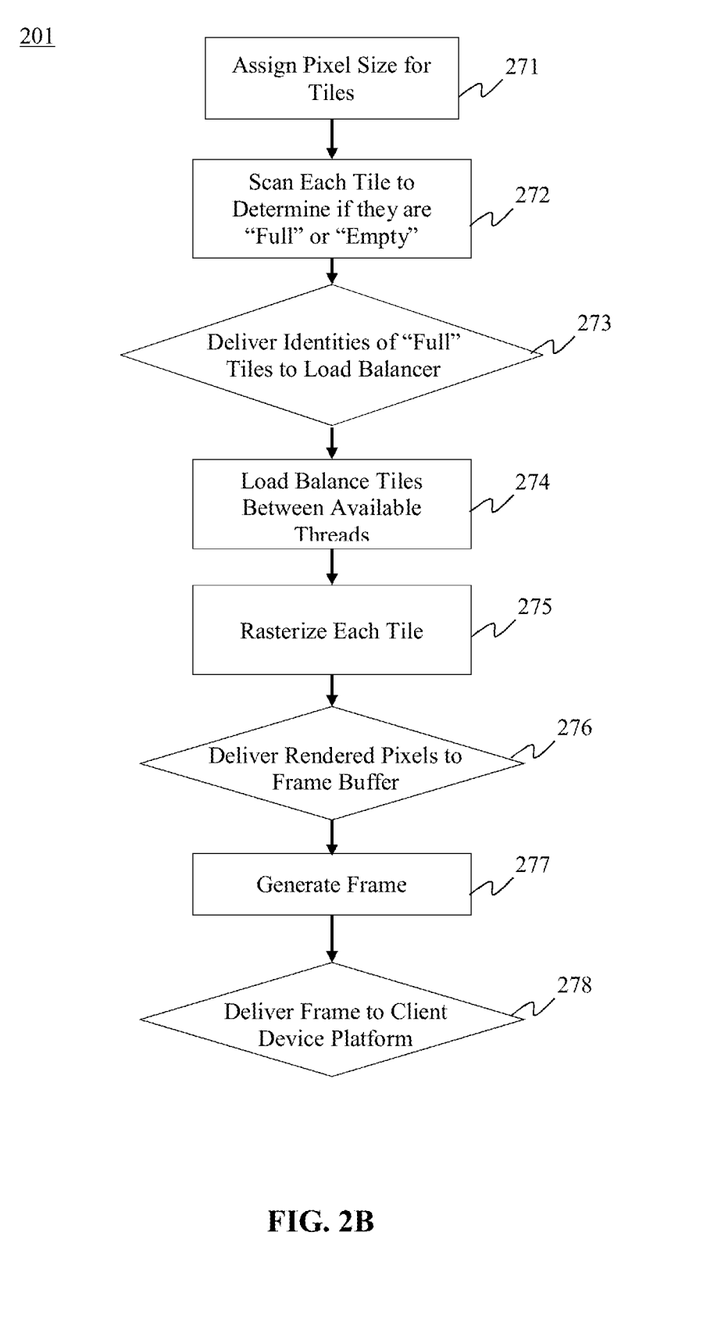

FIG. 2B is a flow diagram of a method 201 for implementing the rasterization step in a graphics pipeline with a software based emulator for a GPU on a cloud-based network according to an additional aspect of the present disclosure. At 271 the emulator 107 may divide a virtual image 320 into smaller tiles 315. By way of example, and not by way of limitation, the height and width of each tile may be 8 pixels by 8 pixels, 16 pixels by 16 pixels, or 32 pixels by 32 pixels. Each tile 315 corresponds to a portion of a frame 319 that may be displayed by the client device platform's display 137.

Figure 3B:
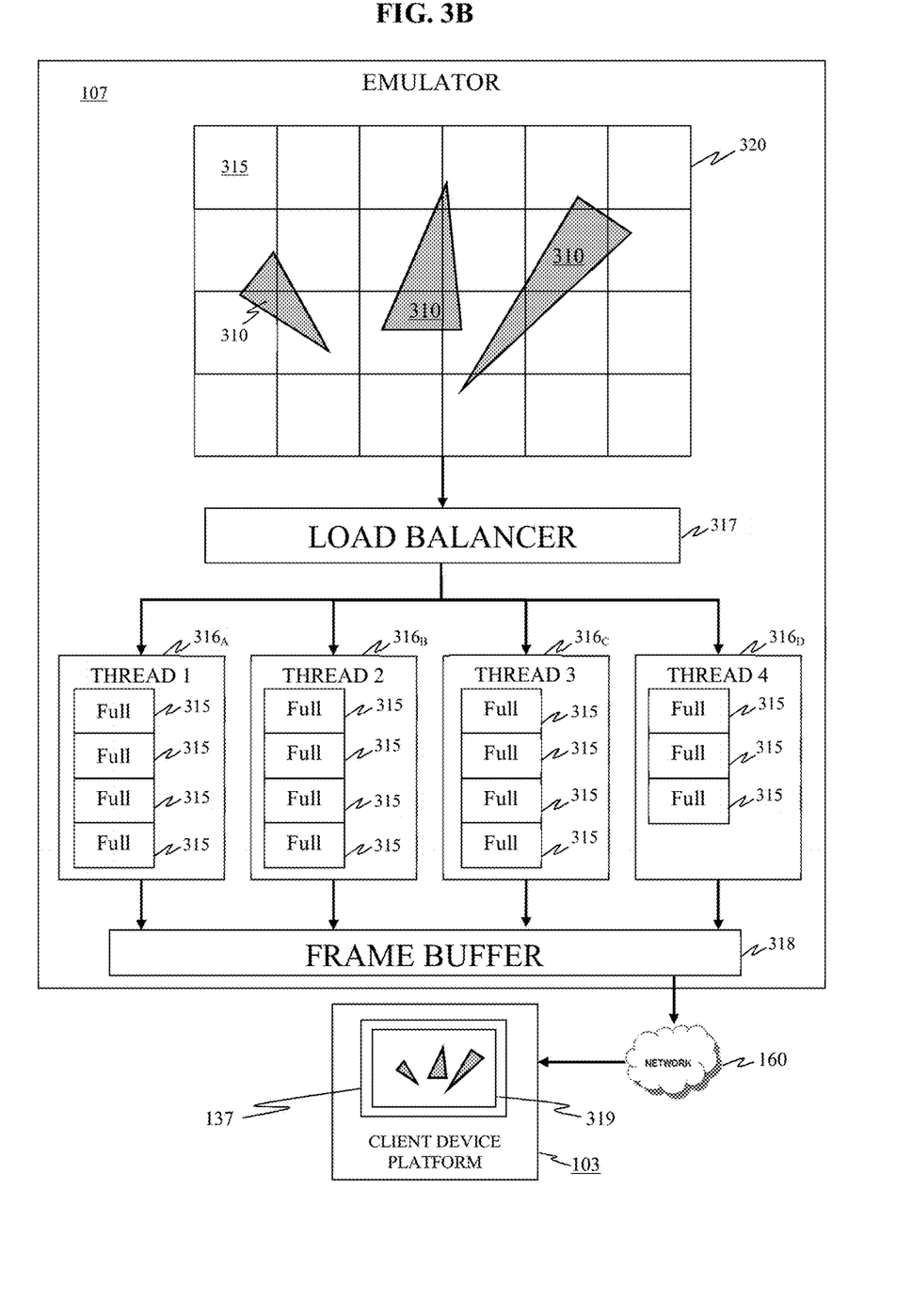

FIG. 3B is a diagram of an emulator system 301. The virtual image 320 contains the graphics primitives 310 that will be rendered to produce a frame 319 that is viewable on the display 137 of the client device platform 103. In the example shown in FIG. 3B, the graphics primitives 310 are a series of triangles. However, it should be noted that the virtual image 320 may contain any alternative type of graphic primitives, such as, but not limited to, lines, points, arcs, vertices, or any combination thereof. Additionally, the graphics primitives 310 are displayed in two dimensions, but the virtual image 320 may also include three-dimensional objects.

Once the virtual image 320 has been divided into the tiles 315, method 201 continues with the emulator 107 determining if any pixels need to be rendered for each tile at 272. If there is at least one pixel that needs to be rendered in a tile 315, then that tile may be designated as a "full" tile 315. If there are no pixels that need to be rendered in a tile 315 (i.e., all pixels in the tile are ignorable), then that tile may be designated as an "empty" tile 315. A "full" designation will be interpreted by the load balancer 317 as indicating that all pixels in the tile 315 need to be rendered, and an "empty" designation will be interpreted by the load balancer 317 as indicating that none of the pixels in the tile 315 need to be rendered. The use of "empty" and "full" designations may improve the scanning speed of the emulator 107 because each tile 315 does not need to be completely scanned. Once a single pixel that requires rendering is detected, the scan of the tile 315 may be ceased. The identification of which tiles 315 are "full" may then be delivered to the load balancer 317 at 273.

The load balancer 317 begins assigning "full" tiles 315 to one or more rasterization threads 316 for rasterization at 274. Load balancer 317 distributes the processing load amongst the available rasterization threads 316 so that each thread 316 has approximately the same processing load. Ideally, the load balancer 317 will distribute the tiles 315 such that each rasterization thread 316 will render the same number of pixels. FIG. 3B illustrates one example of the load balancer 317 distributing the load across several rasterization threads $316_A$, $316_B$, $316_C$, and $316_D$. In this example, each of the tiles 315 assigned to a rasterization thread 316 has been identified as a "full" tile 315. Therefore, it is assumed that each tile will require that every pixel within it will need to be rendered (e.g., in an 8 pixel by 8 pixel tile, it is assumed that there will be 64 pixels that must be rendered). This simplifies the load balancing, because each rasterization thread will be assigned an equal number of "full" tiles 315 to process. However, it should be noted that if the number of tiles 315 that are designated as "full" is not evenly divisible by the number of available rasterization threads 316, then there may be one or more threads 316 that are assigned an additional tile 315 to process. As shown in FIG. 3B there are 15 tiles 315 that have been indicated as "full". Therefore, the load may be divided such that three of the rasterization threads $316_A$, $316_B$, and $316_C$ are each randomly assigned four "full" tiles, and the fourth rasterization thread $316_D$ is randomly assigned three "full" tiles. The use of randomization ensures that the load of each rasterization thread 316 will be approximately even. It should be noted that the number of rasterization threads 316, tiles 315, and pixels displayed in FIG. 3B are given as one example, and that there may be a greater or lesser number of each in an emulator 103. It should also be noted that if a tile does not contain pixels that require rendering, then the thread may not need to process the tile at all.

According to method 200 the rasterization threads 316 begin rasterizing the tiles 315 assigned to them by the load balancer 317 at 275. The rasterization proceeds according to a traditional raster pattern, except that it is limited to the dimensions of a single tile 315. During the rasterization, every pixel that must be rendered is delivered to the frame buffer 318 at 276. The frame buffer 318 may then build the frame 319 that will be displayed on the display 137 of the client device platform 103 at 277. At 278, the emulator 103 delivers the frame 318 to the client device platform 103 over the network 160. Additionally, the emulator 103 may use a video codec to encode the frame 319 before delivering it to the client device platform 103. The client device platform 103 may have suitable codec configured to decode the encoded frame 319.

Figure 4B:
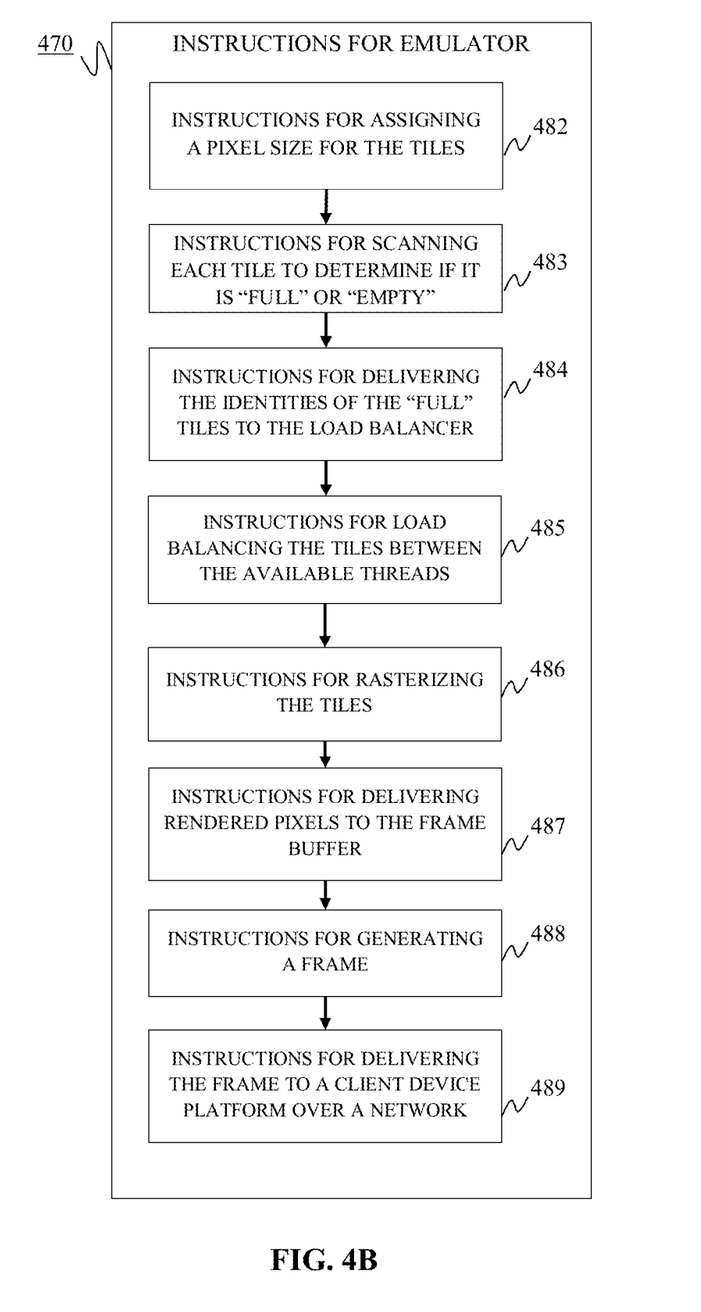

As shown in FIG. 4B, a set of emulator instructions 480 may be implemented, e.g., by the emulator 107. The emulator instructions 480 may be formed on a nontransitory computer readable medium such as the memory 132' or the mass storage device 134'. The emulator instructions 470 may also be part of the process control program 133'. At 482, the instructions may include instructing the emulator to setting the predetermined size for each tile 315 of the virtual image 320. Thereafter at 483, the emulator 107 may be instructed to scan each of the tiles 315 to determine if each tile is "full" or "empty". The emulator 107 may then be instructed to deliver the identities of each "full" tile 315 to the load balancer 317 at 484. The emulator 317 may then be instructed to have the load balancer 317 evenly distribute the processing load between each of the available rasterization threads 316 at 485. Next at 486, the emulator 107 may be instructed to have the rasterization threads 316 begin rasterizing each of the tiles 315. During the rasterization, the emulator 107 may be instructed to deliver the rendered pixels to the frame buffer 318 at 487. The emulator 107 may then be instructed to generate the frame 319 from the pixels in the frame buffer 318 at 488. Thereafter, the emulator 107 may be provided with instructions for delivering the frame 319 to a client device platform 103 over a network 160 at 489.

As may be seen from the foregoing, certain aspects of the present disclosure may be used to facilitate distribution of the processing load for rasterization of a virtual image containing graphics primitives through the use of tiling. Tiling makes it possible to determine the processing loads that need to be distributed.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A nontransitory computer readable medium containing program instructions for rasterizing a virtual image, wherein the virtual image comprises one or more graphic primitives, and wherein execution of the program instructions by one or more processors of a computer system causes the one or more processors to carry out a method, the method comprising:

a) dividing the virtual image to be rasterized into a plurality of tiles, wherein each of the tiles include a predetermined number of image pixels, wherein each of the image pixels is either an ignorable pixel or a pixel that needs to be rendered;
b) determining how many of the image pixels in each of the tiles are pixels that need to be rendered;
c) assigning each of the plurality of tiles to one of a plurality of rasterization threads, wherein each rasterization thread is assigned a quantity of tiles such that a total number of pixels that need to be rendered by each rasterization thread is approximately the same, wherein tiles with only ignorable pixels are not assigned to a rasterization thread, wherein each of the tiles that have at least one pixel that needs to be rendered is randomly assigned to the one of the plurality of rasterization threads;
d) rasterizing each of the plurality of tiles with the rasterization threads, wherein pixels that need to be rendered are rendered and are delivered to a frame buffer;
e) generating a frame of the virtual image from the pixels in the frame buffer; and
f) delivering the frame to a client device platform over a network.

2. The non-transitory computer readable medium of claim 1, wherein all of the image pixels in a tile are assumed to be pixels that need to be rendered when at least one of the image pixels in the tile is a pixel that needs to be rendered.

3. The non-transitory computer readable medium of claim 1, wherein the plurality of rasterization threads operate in parallel.

4. The non-transitory computer readable medium of claim 1, wherein the one or more graphic primitives form a three-dimensional object.

5. The non-transitory computer readable medium of claim 1, wherein the one or more graphic primitives are lines, points, arcs, vertices, triangles, polygons, or any combination thereof.

6. The non-transitory computer readable medium of claim 1, wherein generating the frame includes encoding the pixels in the frame buffer.

7. The non-transitory computer readable medium of claim 1, wherein the size of each tile is 8 pixels by 8 pixels.

8. The non-transitory computer readable medium of claim 1, wherein the size of each tile is 16 pixels by 16 pixels.

9. In an emulator of a graphics processing unit (GPU) configured to operate on a network, a method of rasterizing a virtual image, wherein the virtual image comprises one or more graphic primitives, comprising: a) dividing the virtual image to be rasterized into a plurality of tiles, wherein each of the tiles include a predetermined number of image pixels, wherein each of the image pixels is either an ignorable pixel or a pixel that needs to be rendered;
b) determining how many of the image pixels in each of the tiles are pixels that need to be rendered;
c) assigning each of the plurality of tiles to one of a plurality of rasterization threads, wherein each rasterization thread is assigned a quantity of tiles such that a total number of pixels that need to be rendered by each rasterization thread is approximately the same, wherein tiles with only ignorable pixels are not assigned to a rasterization thread, wherein each of the tiles that have at least one pixel that needs to be rendered is randomly assigned to the one of the plurality of rasterization threads;
d) rasterizing each of the plurality of tiles with the rasterization threads, wherein pixels that need to be rendered are rendered and are delivered to a frame buffer;
e) generating a frame of the virtual image from the pixels in the frame buffer; and
f) delivering the frame to a client device platform over a network.

10. An emulator configured to operate on a network, comprising:
a processor;
a memory coupled to the processor;
one or more instructions embodied in memory for execution by the processor, the instructions being configured implement a method for rasterizing a virtual image, wherein the virtual image comprises one or more graphic primitives, the method comprising:
a) dividing the virtual image to be rasterized into a plurality of tiles, wherein each of the tiles include a predetermined number of image pixels, wherein each of the image pixels is either an ignorable pixel or a pixel that needs to be rendered;
b) determining how many of the image pixels in each of the tiles are pixels that need to be rendered;
c) assigning each of the plurality of tiles to one of a plurality of rasterization threads, wherein each rasterization thread is assigned a quantity of tiles such that a total number of pixels that need to be rendered by each rasterization thread is approximately the same, wherein tiles with only ignorable pixels are not assigned to a rasterization thread, wherein each of the tiles that have at least one pixel that needs to be rendered is randomly assigned to the one of the plurality of rasterization threads;
d) rasterizing each of the plurality of tiles with the rasterization threads, wherein pixels that need to be rendered are rendered and are delivered to a frame buffer;
e) generating a frame of the virtual image from the pixels in the frame buffer; and
f) delivering the frame to a client device platform over a network.

* * * * *